UNITED STATES PATENT OFFICE.

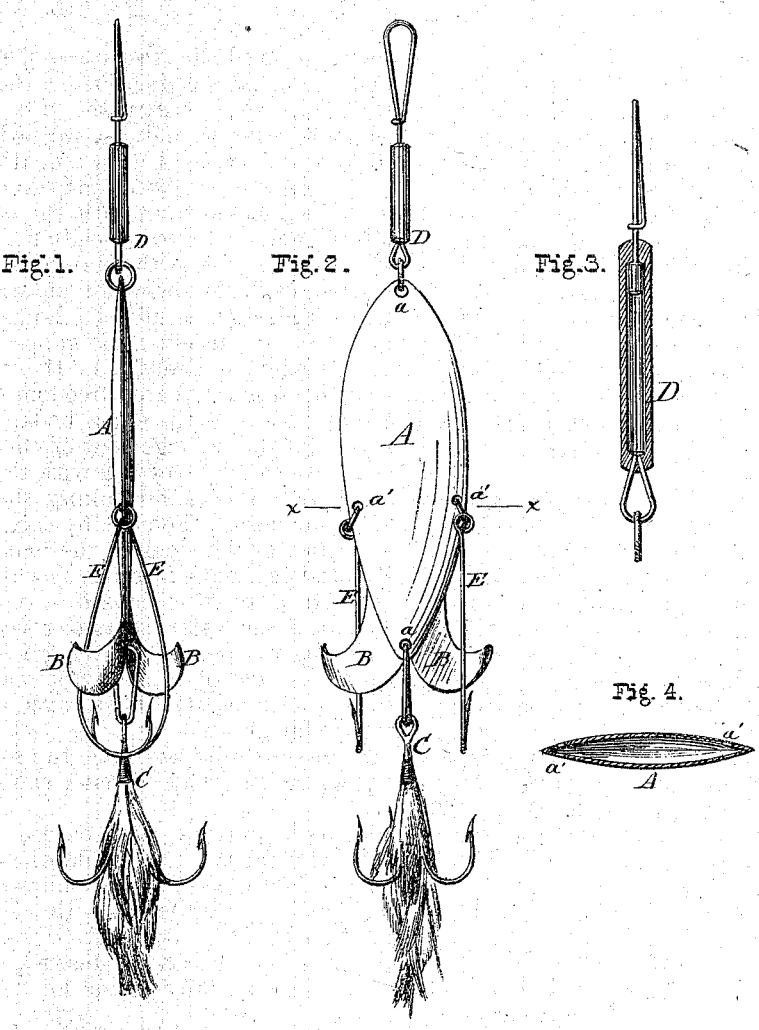

WILLIAM D. CHAPMAN, OF THERESA, NEW YORK.

IMPROVEMENT IN MINNOW-PROPELLERS.

Specification forming part of Letters Patent No. 115,434, dated May 30, 1871; antedated May 19, 1871.

*To all whom it may concern:*

Be it known that I, WILLIAM D. CHAPMAN, of Theresa, in the county of Jefferson and in the State of New York, have invented certain new and useful Improvements in Minnow-Propellers; and do hereby declare that the following is a full, clear, and exact description thereof, reference being had to the accompanying drawing making a part of this specification, in which—

Figure 1 is an edge view of my improved device; Fig. 2 is a side elevation of the same; Fig. 3 is a central longitudinal section of the swivel; and Fig. 4 is a cross-section of the body of the device on the line $x\ x$ in Fig. 2.

Letters of like name and kind refer to like parts in each of the figures.

My invention is an improvement upon a similar device for which Letters Patent No. 104,930 were issued to me July 5, 1870; and it consists, principally, in the construction of the body of the device, and in the manner of forming and attaching thereto the tail, substantially as is hereinafter shown. It also consists in the employment of one or more hooks upon the side of the device, substantially as is hereinafter specified, and for the purpose set forth.

In the annexed drawing, A represents the body of the device, formed of two corresponding plates of thin sheet metal, having the general form shown in Fig. 2, made concave, and with their edges joined together. The tail B is constructed of one piece of metal, and is secured in position by being soldered between the plates forming the body. The body is preferably composed of two plates of metal, having different colors; but, if desired, said plates may be alike. The tail-piece should be formed of some flexible material, in order that its wings may be readily curved more or less, in order to increase or diminish the velocity with which the bait revolves. An opening, $a$, formed in and through the body A at or near each end, furnishes a means whereby the hook or hooks C and swivel D may be connected therewith. Two other openings, $a'$, formed in the sides a little below the vertical center of the body, permit the free access of water to its interior, and also furnish a means whereby extra hooks E may be attached to said body, if desired. The hooks C and swivel D are so connected to or with the body as to permit of their ready transposition, if desired.

As thus constructed the device is complete and possesses the following advantages: First, in shape it closely resembles a fish, and thereby more readily deceives the game. Second, the draft being entirely from the front end, the bait possesses greater freedom of action. Third, by means of the extra hooks upon the sides, and of the arrangement of the hooks at the tail, the same revolving with the body of the bait, the chances for taking the fish are largely increased. Fourth, by means of the holes drilled at the sides of the bait, water is freely admitted to the interior, by which means its specific gravity is caused to correspond with that of the water, so as to give it all the advantages of a propeller having a body composed of a single plate or of two open plates, while at the same time its strength and durability are far greater.

Having thus fully set forth the nature and merits of my invention, what I claim as new, is—

A minnow-propeller, composed of the body A, formed of the two convex plates, secured together at their edges so as to embrace the tail-piece B, and provided with the openings $a$ and $a'$, and having attached to its end and sides, or either, as may be desired, the hooks C and E, substantially as and for the purpose specified.

In testimony that I claim the foregoing I have hereunto set my hand this 24th day of October, 1870.

WILLIAM D. CHAPMAN.

Witnesses:
A. P. SALISBURY,
WILLIAM WALRADT.